Figure 1:
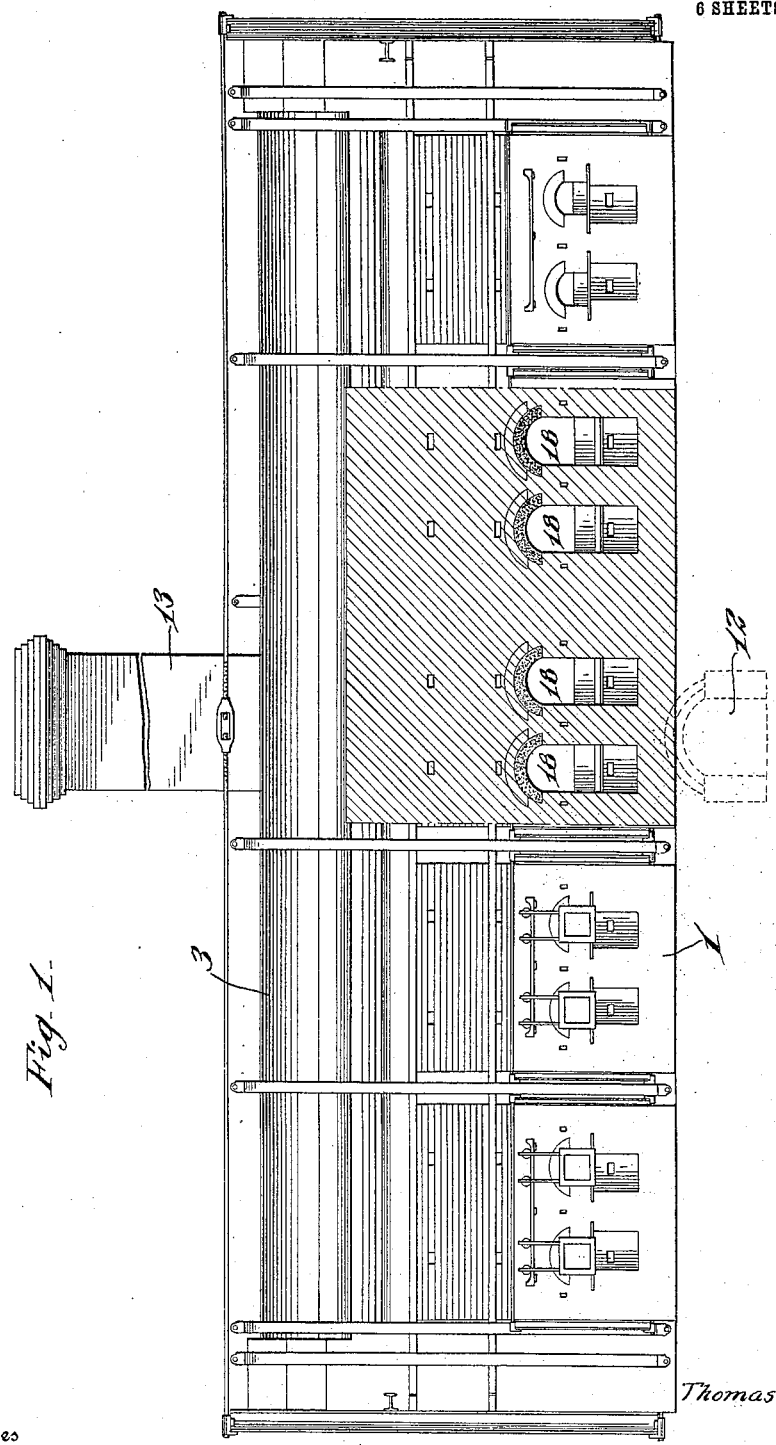

T. M. WILSON.
KILN.
APPLICATION FILED FEB. 20, 1909.

946,088.

Patented Jan. 11, 1910.
6 SHEETS—SHEET 1.

Witnesses

Inventor
Thomas M. Wilson,
By Joshua R. H. Potts.
Attorney

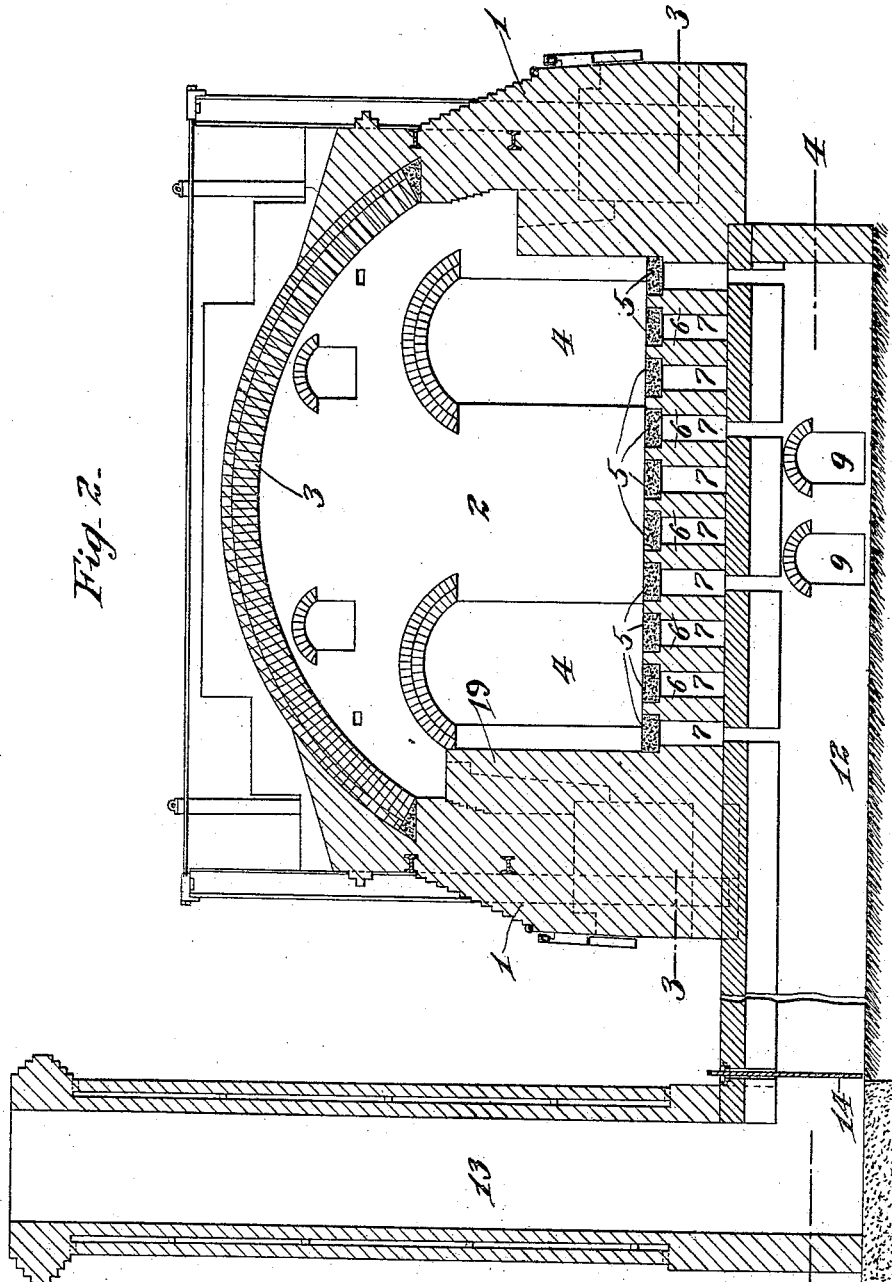

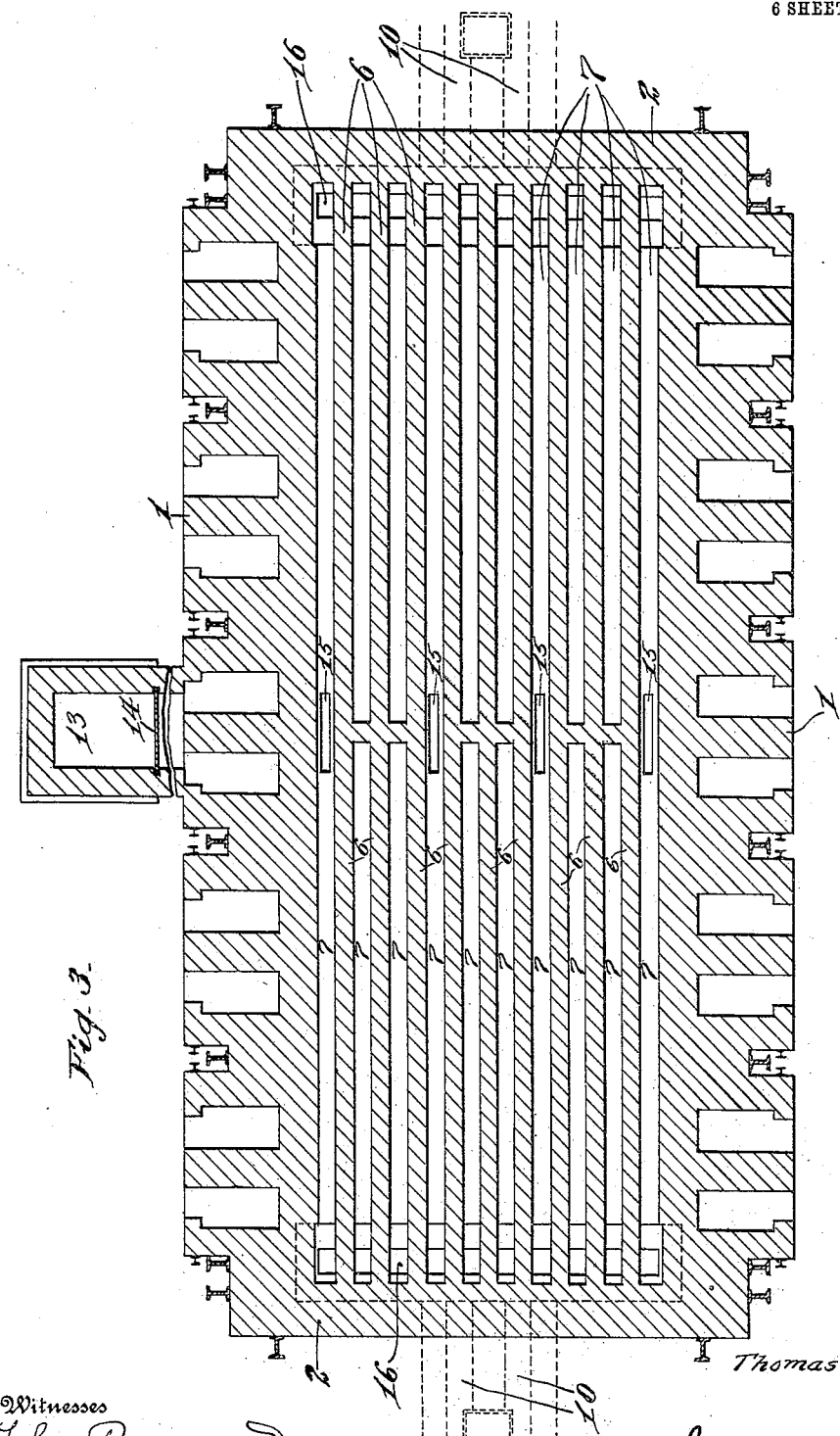

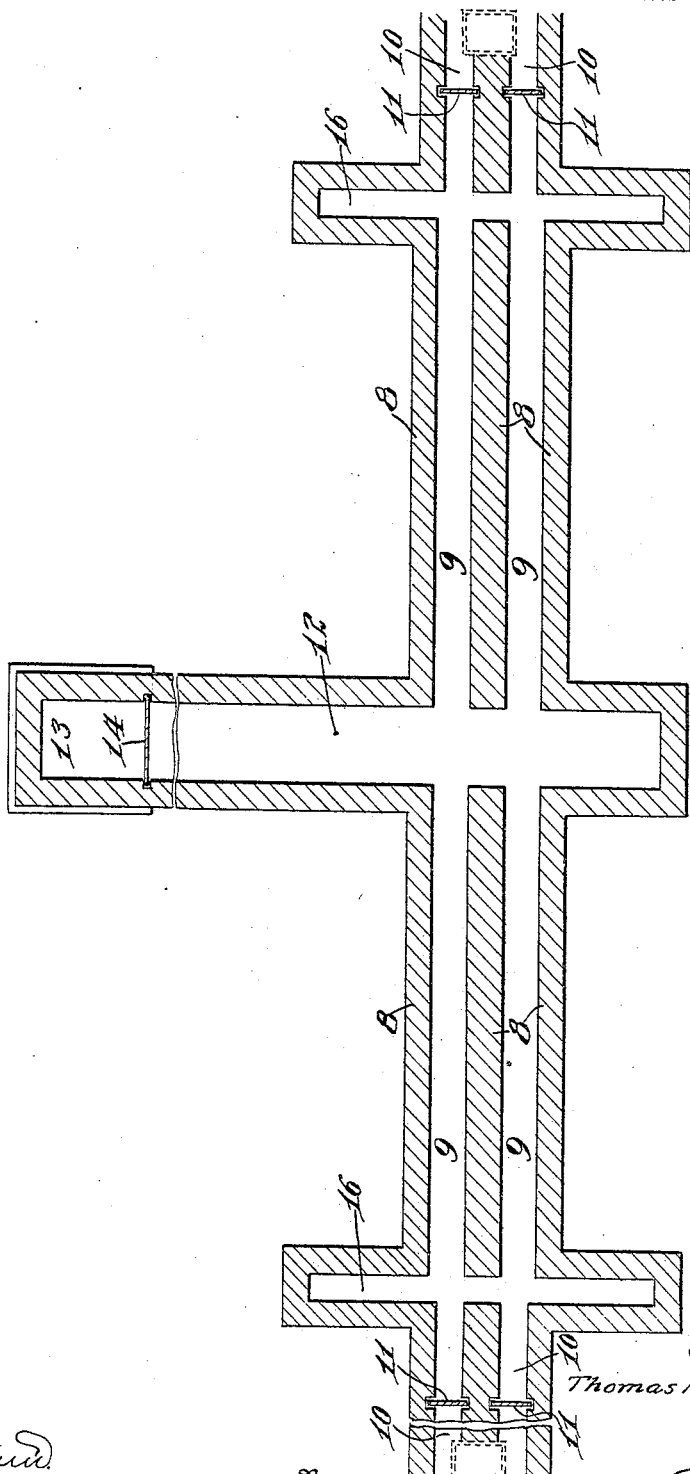

T. M. WILSON.
KILN.
APPLICATION FILED FEB. 20, 1909.
946,088.
Patented Jan. 11, 1910.
6 SHEETS—SHEET 5.
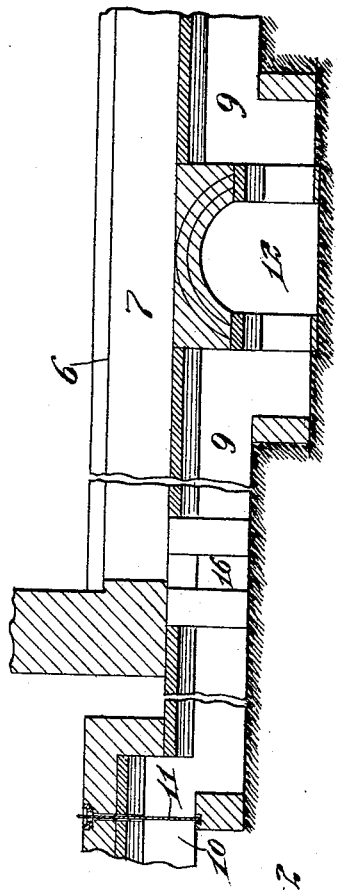
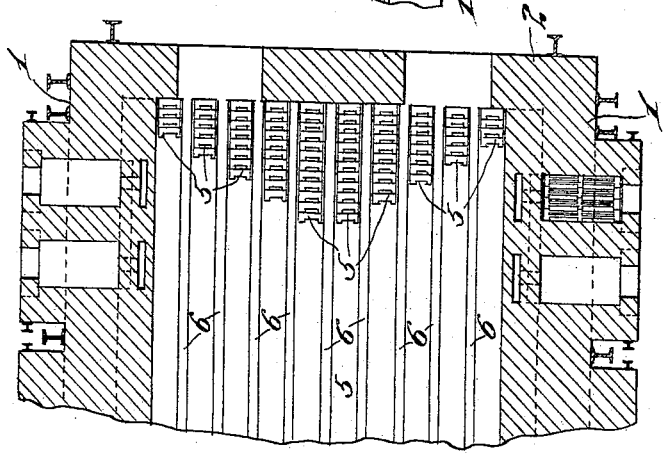

T. M. WILSON.
KILN.
APPLICATION FILED FEB. 20, 1909.
946,088.
Patented Jan. 11, 1910.
6 SHEETS—SHEET 6.
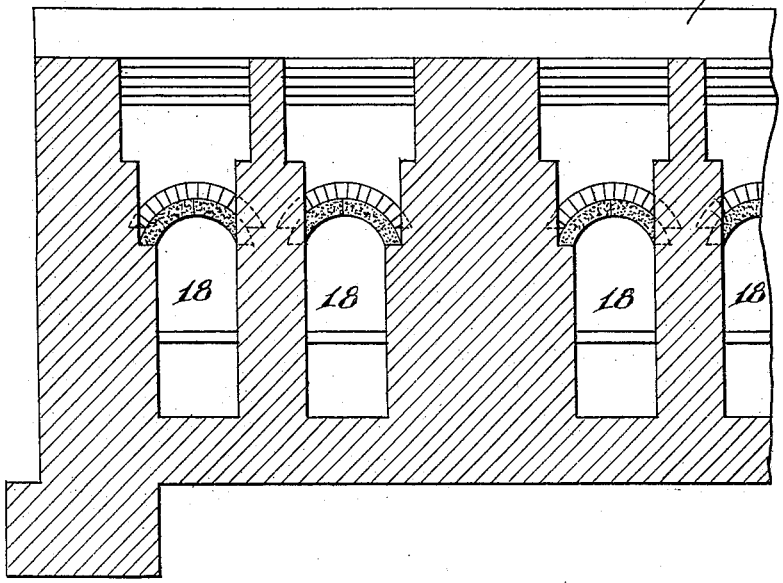
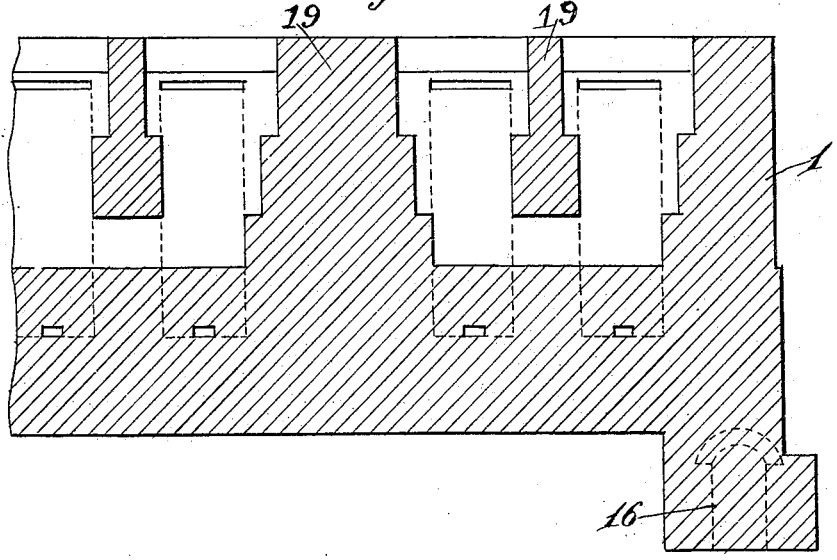
Witnesses
Theo. Rosenaud.
J. A. L. Mulhall.
Inventor
Thomas M. Wilson,
By Joshua R. H. Potts
Attorney

UNITED STATES PATENT OFFICE.

THOMAS M. WILSON, OF PHILADELPHIA, PENNSYLVANIA.

KILN.

946,088.  Specification of Letters Patent.  Patented Jan. 11, 1910.

Application filed February 20, 1909. Serial No. 479,245.

*To all whom it may concern:*

Be it known that I, THOMAS M. WILSON, a citizen of the United States, residing at Philadelphia, in the county of Philadelphia and State of Pennsylvania, have invented certain new and useful Improvements in Kilns, of which the following is a specification.

My invention relates to improvements in kilns, the object of the invention being to provide a kiln having a single stack, with an improved arrangement of flues insuring a uniform distribution of the heat throughout the interior of the kiln, and a perfect draft through said stack.

A further object is to provide an improved arrangement of parallel longitudinal flues, with cross flues below the same, and located at the ends and at the center of the kiln, and connected by longitudinal flues, and provide communication between certain of said first mentioned longitudinal flues with the center flue, and communication between the others of said flues with the end cross flues, and provide a stack with which the center flue communicates.

A further object is to provide an improved arrangement of flues, all of which communicate with a stingle stack, and provide outlet flues through which the waste heat may be drawn to a drier, and provide dampers in the said outlet flues, and in the stack flues.

With these and other objects in view, the invention consists in certain novel features of construction, and combinations, and arrangements of parts as will be more fully hereinafter described and pointed out in the claims.

In the accompanying drawings, Figure 1, is a view partly in elevation, partly in longitudinal section through the fire-boxes, and partly dismantled illustrating my improvements. Fig. 2, is a view in cross section through the center of the kiln. Fig. 3, is a plan view on the line 3—3 of Fig. 2. Fig. 4, is a plan view on the line 4—4 of Fig. 2. Fig. 5, is a fragmentary view in plan taken above the kiln floor. Fig. 6, is a view in longitudinal section through the center longitudinal flue 16. Fig. 7, is an inside face view of the kiln wall taken from a point between the bridge wall and the kiln, and Fig. 8, is a view similar to Fig. 7, but taken at a point inside of the kiln and looking at the bridge wall.

1 represents the side walls of my improved kiln, 2 the end walls, and 3 the arch connecting the side walls and constituting a roof for the kiln. The ends of the kiln are provided with entrances 4, to admit the workmen in charging and emptying the kiln, it being of course understood that these entrances are sealed during the burning operation.

5 represents the kiln floor which is composed of fire brick having spaces between them constituting an open work structure through which the smoke and gases can freely pass to the flues below. The floor brick are supported upon a series of parallel longitudinal chords 6, spaced an equal distance apart, and extending throughout the entire area of the kiln below the floor, forming a series of longitudinal parallel flues 7 extending throughout the length of the kiln. Below these chords 6 and extending throughout the center of the kiln, are three parallel chords 8, arched over at their tops constituting two parallel longitudinal flues 9, with which waste flues 10 communicate at the end of the kiln, for conveying the waste heat from the kiln to a drier, and suitable dampers 11 are provided in these waste heat flues, which are of course closed during the burning operation of the kiln.

The parallel flues 9, communicate at their center, with a large central cross flue 12, which latter communicates with a stack 13, outside of the kiln wall, and a damper 14 is provided in the flue 12, to close communication with the stack when the waste heat is being drawn from the kiln, this damper being open during the burning operation.

The flue 12 is arched over, at its top, and is closed against communication with the flues 7, except at four points, where openings 15 are provided, of approximately one-half the width of the flues 7, and permit the smoke and gases from the two outside flues 7 to pass into the flue 12, and also the smoke and gases from the fourth flue from the outside walls to communicate with the said flue 12. It will thus be seen that every third flue across the kiln will communicate with the central cross flue 12.

At the ends of the kiln, cross flues 16 are provided, and communicate with the longitudinal flues 9. With these crossed flues 16, all of the longitudinal flues 9 communicate, so that the smoke and gases which enter the central portion of every third flue 9, may pass directly into the central cross flue 12, and the smoke and gases entering as above explained, into all other of said flues 9 must pass to the ends of the kiln entering cross flues 10, and move through the longitudinal flues 9 to the cross flue 12, and thence out the stack 13. By this arrangement of flues, the smoke and gases passing through the floor are compelled to move longitudinally of the kiln, at least a portion of said smoke and gases is so compelled, and a uniform heat is therefore provided throughout the interior of the kiln.

Twin furnaces 18 are provided in the kiln walls 1, and the smoke and gases from all of these furnaces will pass over the bridge walls 19 in front of the fire-boxes and into the kiln chamber, and thence down through the open work floor 5 in the flues 9 below, where a portion of the smoke and gases will enter directly into the flue 12, but a greater portion will be compelled to move longitudinally of the kiln thereof, and thence into the cross flues 16, through the longitudinal flues 9, through cross flue 12 and up the stack.

The construction of the furnaces are exactly like that set forth in my application for patent executed on even date herewith, and hence need not here be described in detail.

Various slight changes might be made in the general form and arrangement of parts described without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

1. In a kiln, the combination with an open work floor, of a series of longitudinal flues directly below, and communicating with the perforated floor, a central cross flue below the longitudinal flues, end cross flues below the longitudinal flues, and in the same plane as the central cross flue, longitudinal flues connecting the cross flues, said central cross flue communicating with certain of the first mentioned longitudinal flues, and the end cross flues communicating with all of the longitudinal flues.

2. In a kiln, the combination with an open work floor, of a series of longitudinal flues below the floor, and cross flues at the center and at the ends of the kiln below said longitudinal flues, and said cross flues having flues connecting them, and certain of said first mentioned longitudinal flues, communicating with the central cross flue, and all of said longitudinal flues communicating with the cross flues at the ends of the kiln.

3. In a kiln, the combination with an open work structure, of a series of parallel longitudinal chords below and supporting the floor, and providing a series of parallel longitudinal flues extending throughout the length of the kiln, of cross flues at the center and at the ends of the kiln below said longitudinal flues, a stack communicating with the central cross flue, longitudinal flues communicating with the central cross flue, and all of said first mentioned longitudinal flues communicating with the end cross flues and said lower flues closed against communication with said longitudinal flues at all other points.

4. In a kiln, the combination with lower cross flues, a stack on one end of said flue, cross flues at the ends of the kiln, longitudinal flues connecting said cross flues, and all of said flues arched over and closed at their tops, of a series of longitudinal chords above said flues, and providing a series of longitudinal parallel flues, openings in the arched over top of the central cross flue, of smaller width than the width of said longitudinal flues, and permitting communication with certain of said longitudinal flues, and the central cross flue, all of said longitudinal flues communicating with the end cross flues by means of openings in the arched top of said end cross flues, and an open work structure supported upon said longitudinal chords.

5. In a kiln, the combination with lower cross flues, a stack on one end of said flue, cross flues at the ends of the kiln, longitudinal flues connecting said cross flues, and all of said flues arched over and closed at their tops, of a series of longitudinal chords above said flues, and providing a series of longitudinal parallel flues, openings in the arched over top of the central cross flue, of smaller width than the width of said longitudinal flues, and permitting communication with certain of said longitudinal flues, and the central cross flue, all of said longitudinal flues communicating with the end cross flues by means of openings in the arched tops of said end cross flues, and an open work structure supported upon said longitudinal chords, and waste heat flues communicating with the lowest longitudinal flues, and dampers in said waste heat flues and into the central cross flue.

In testimony whereof I have signed my name to this specification in the presence of two subscribing witnesses.

THOMAS M. WILSON.

Witnesses:
R. H. KRENKEL,
J. A. L. MULHALL.